United States Patent [19]

Jay et al.

[11] Patent Number: 5,730,604
[45] Date of Patent: Mar. 24, 1998

[54] METHOD AND APPARATUS FOR CORRELATING EDUCATIONAL REQUIREMENTS

[75] Inventors: Michael E. Jay, Bellingham, Wash.; Robert J. Collins, Vancouver, Canada; Richard S. Jeffrey, Surrey, Canada; Colin Ramsay, Abbotsford, Canada

[73] Assignee: MediaSeek Technologies, Inc., Vancouver, Canada

[21] Appl. No.: 783,406

[22] Filed: Jan. 14, 1997

Related U.S. Application Data

[63] Continuation of Ser. No. 259,039, Jun. 13, 1994, abandoned.
[51] Int. Cl.⁶ .............. G09B 25/00; G09B 5/00; G09B 19/00; G09B 3/00
[52] U.S. Cl. .............. 434/365; 434/169; 434/219; 434/307 R; 434/322
[58] Field of Search .............. 434/169, 307 R, 434/322, 365

[56] References Cited

U.S. PATENT DOCUMENTS 5,278,751   1/1994   Adiano et al. .............. 364/402

*Primary Examiner*—Richard J. Apley
*Assistant Examiner*—John Rovnak
*Attorney, Agent, or Firm*—Seed and Berry LLP

[57] ABSTRACT

A method and apparatus for correlating requirements of educators, guiding documents, and educational resource providers is described. The apparatus includes a central correlator accessed by each of the external entities using keys established according to a uniform protocol. The correlator includes a central database including a range of elements describing in varying levels of detail a field of study. Each of the external users correlates a set of components, such as the components of a teaching plan, to the elements in the central database. The apparatus correlates the several sets of components to the external user's set of components and provides the various correlations through a variety of outputs.

3 Claims, 16 Drawing Sheets

207 — { Customary metric units for speed are m/s and km/h.

207 — { When an object is moving, the speed is other than zero.

Speed and velocity are not the same.

Knowing both the speed and direction that something moves, is to know its velocity.

207 — { Velocity is a relative concept depending on the frame of reference.

Metric units are used to compute work done in moving an object.

Syllabus Scheduled Outline – Physics 11(1)

| Unit / Topic / Lesson / Outcome | Num Prds | Start Date | Has Corr. | Has Tags |
|---|---|---|---|---|
| ▶ Energy | | | | |
| ▶ Forms of Energy | 6.0 | Sep 12 | ✓ | ✓ |
| ▶ Magnetic Energy | 6.0 | Sep 12 | ✓ | ✓ |
| • Moving electrical energy always produces a field of mag | 2.0 | Sep 12 | ✓ | ✓ |
| • Magnetic field strength around an electric conductor vari | | | ✓ | ✓ |
| ▶ Heat Energy | 1.0 | Sep 14 | ✓ | ✓ |
| • Recognize that heat is a form of energy | | | ✓ | ✓ |
| ▶ Magnetic Energy | 3.0 | Sep 15 | ✓ | ✓ |
| • Explain how the strength of magnetic force changes in | | | | |
| • Predict that a stronger magnet may be made by coiling | | | | |

Lesson Plan – Physical Science(1)
Velocity, Speed, ... (Force and Motion, Motion)  Wed. May 11, 1994 Prd 1   [Detail]

Outcomes
- Students will determine the speed of an object.
- Students will explain the relationship between speed, velocity, and acceleration.
- Students will calculate speed, velocity, and acceleration for problems based on objects they observe.

Suggested Resource Components
- Conceptual Physics, Ch.2, p.11–16
- Wind Surfing, Newton's Apple
- Physics of the Indy 500,
- Physics Modules: Acceleration, Projectile, and Waves
- Physics Simulation I: Mechanics
- Physics Topics: Force and Motion
- Science CAP CD ROM
- Middle School and Integrated Science Lab Manual
- Universal Lab Interface

Activities (4)   [Add] [Delete]
Students view the Addison Wesley video, *Linear Motion*. After watching the video, students, in small groups, will determine the average walking speed for their group. Each group will describe to the class the method used to calculate the speed. The class will develop an algorithm for determining the speed of an object.

Homework (3)   [Add] [Delete]
- Explain speed, velocity, and acceleration in relation to your family car. What two controls on a car enable a change in speed? Name another control that enables velocity. How does a car handle acceleration?

Suggested Teaching Strategies
- Whole Class Demo/Modelling
- Small group/Collaborative
- Hands-On
- Simulation

METHOD AND APPARATUS FOR CORRELATING EDUCATIONAL REQUIREMENTS

CROSS-REFERENCE TO RELATED APPLICATION

This application is a continuation of U.S. patent application Ser. No. 08/259,039, filed Jun. 13, 1994, now abandoned.

TECHNICAL FIELD

The present invention relates to methods and apparatuses for correlating educational requirements, and more particularly, to a method and apparatus for correlating components of guiding documents, educational resources, and educational programs.

BACKGROUND OF THE INVENTION

Educators must take many factors into consideration in developing educational programs. For example, various governing bodies, such as state and local school boards, establish educational requirements or recommendations. Also, educators must evaluate available educational resources and develop educational programs accordingly.

The educational requirements or recommendations are typically embodied in formal documents. Such requirements or recommendations will thus be referred to herein as "guiding documents." After such guiding documents are produced, educators are encouraged, or required, to incorporate in their educational plans the educational criteria called for by the guiding documents.

To enable the educators to achieve these requirements, educational resource providers, such as textbook producers, produce resources which preferably correlate to the guiding documents requirements. The resource providers presently attempt to perform this correlation by obtaining the guiding documents and, in the subjective determination of the textbook provider, design educational resources which may be correlated to the teaching requirements expressed in the guiding documents.

Similarly, educators have attempted to identify independently the educational resources appropriate to achieve the teaching goals in their educational plans. This determination is often made independently of the review of the guiding documents. Once again, the guiding documents are interpreted subjectively by an entity other than the producer of the guiding documents.

SUMMARY OF THE INVENTION

A method and apparatus for identifying, correlating, and retrieving components of various educational structures is described. Through the apparatus, an educator may subjectively establish a correlation between an educational program, such as a teaching plan, and a central knowledge base of conformed statements. After establishing the subjective correlation, the educator can then retrieve elements of educational guiding criteria such as guiding documents produced by educational authorities, which correlate to the educational elements in the conformed central knowledge base. Through this apparatus, the educator may then identify those components of guiding document requirements or recommendations correlated to components of an educational program.

In addition, the apparatus permits resources, such as textbooks, videotapes, and other educational resources, to be correlated to the knowledge base in the subjective judgment of the resource provider. The educator can then, through the apparatus, identify resources correlated to the elements in the central knowledge base to which the educator's educational program is correlated. The educator may thus identify educational resources appropriate to present the components of the educational program and simultaneously identify components of the guiding documents addressed by the educational program.

A correlation apparatus for correlating components of educational programs, education guidance criteria, and educational resources, is also described. The apparatus comprises a first storage medium containing a central knowledge base of conformed educational elements, wherein the elements are conformed statements relating to an area of study. The apparatus also includes a correlator for correlating components of the educational programs, educational guidance criteria and resources to the conformed educational elements which is connected to retrieve the educational elements from the central knowledge base. The correlation apparatus also includes an educator interface module connected to the correlator for inputting components of the educational programs to the correlator, a resource provider interface module connected to the correlator for inputting the components of the resources to the correlator, and a guiding body interface module connected to the correlator for inputting the components of the educational guidance criteria to the correlator. The apparatus also includes a second storage medium containing a guiding document unidirectional correlation indicating correlation between components of the educational guiding criteria and the conformed knowledge base. The apparatus also includes a third storage medium containing a resource unidirectional correlation which indicates correlation between components of the resource and the conformed knowledge base. Also, the apparatus includes a fourth storage medium containing an educator unidirectional correlation indicating correlation between components of the educational program and the conformed knowledge base.

In one embodiment, an educational planning tool for identifying correlations between educational programs and components of educational resources or guiding criteria is described, the planning tool including a first storage medium containing a central knowledge base of conformed educational elements, a correlator that correlates components of the educational program to the conformed educational elements, an interface module for inputting to the correlator an educator key to identify correlations between individual ones of the components and corresponding conformed educational elements, and a second storage medium for storing the educator key. The planning tool also includes a third storage medium containing data indicating correlation between educational guiding criteria and the conformed educational elements, and a fourth storage medium containing data indicating correlation between educational resources and the conformed educational elements.

In one embodiment, an educational correlating tool for correlating educational plans to guiding criteria is described. The correlating tool includes a first storage medium containing the central knowledge base of conformed educational elements and a correlator for correlating components of the guiding criteria to the conformed educational elements wherein the correlator is connected to retrieve the educational elements from the knowledge base, an interface module for inputting to the correlator a guiding key to identify correlations between individual ones of the guiding criteria components and corresponding conformed educational elements, and a second storage medium for storing the guiding key. The correlating tool also includes a database containing the guiding criteria components wherein the correlator is connected to retrieve the guiding document components from the database.

In a method according to the invention, a method for identifying components correlated to a component of an educational program comprises the steps of storing a set of guiding document components on a first storage medium, producing a first key indicating correlation between the guiding document components and elements in a central knowledge base of conformed educational elements, the elements being stored on a second storage medium, storing a set of resource components on a third storage medium, producing a second key indicating correlation between the resource components and the elements in the central knowledge base, storing an educational program component on a fourth storage medium, producing a third key indicating correlation between the educational program component and the elements in the central knowledge base, and identifying components in the first and third storage medium correlating to the educational component. The step of identifying the correlated components in the first storage medium includes the steps of retrieving the first key, producing a bidirectional correlation between the guiding document components and the elements in the knowledge base from the first key, retrieving the third key, and producing from the third key and the bidirectional correlation between the guiding document components and elements in the knowledge base, a correlation between the educational program component and the guiding document components. The step of identifying the correlated components in the third storage medium includes retrieving the second key, producing a bidirectional correlation between the resource components and the elements in the knowledge base from the first key, retrieving the third key, and producing from the third key and the bidirectional correlation between the resource components and the knowledge base a correlation between the educational program component and the resource components. In one embodiment, the step of producing the first, second, and third keys comprises creating a linked list in a corresponding memory identifying elements in the conformed knowledge base correlating to the guiding document component, resource component, and educational component, respectively.

A method of retrieving components of guiding documents correlated to a component of an educational program schedule comprises the steps of storing a set of guiding document components on a first storage medium, producing a first key indicating correlation between the guiding document components and elements in a central knowledge base of conformed educational elements on a second storage medium, storing an educational program component on a third storage medium, producing a second key indicating correlation between the educational program component and the elements in the central knowledge base, identifying guiding document components in the first storage medium correlating to the educational component, and retrieving the identified guiding document components from their corresponding storage media.

BRIEF DESCRIPTION OF THE DRAWINGS

FIG. 3 is a representational presentation of a portion of the knowledge base.

FIG. 4b is a diagrammatic representation of linked lists and associated headers and tags, corresponding to the correlation of FIG. 4a.

FIG. 5b is a diagrammatic representation of linked lists and associated headers and tags, corresponding to the correlation of FIG. 5a.

FIG. 6b is a diagrammatic representation of linked lists and associated headers and tags, corresponding to the correlation of FIG. 6a.

FIG. 11 is a screen shot showing a lesson plan in outline form and indicating correlations, dates and tags.

FIG. 13 is a output screen display presenting the correlation between components of an educational program and components of available resources.

DETAILED DESCRIPTION OF THE INVENTION

Figure 1:
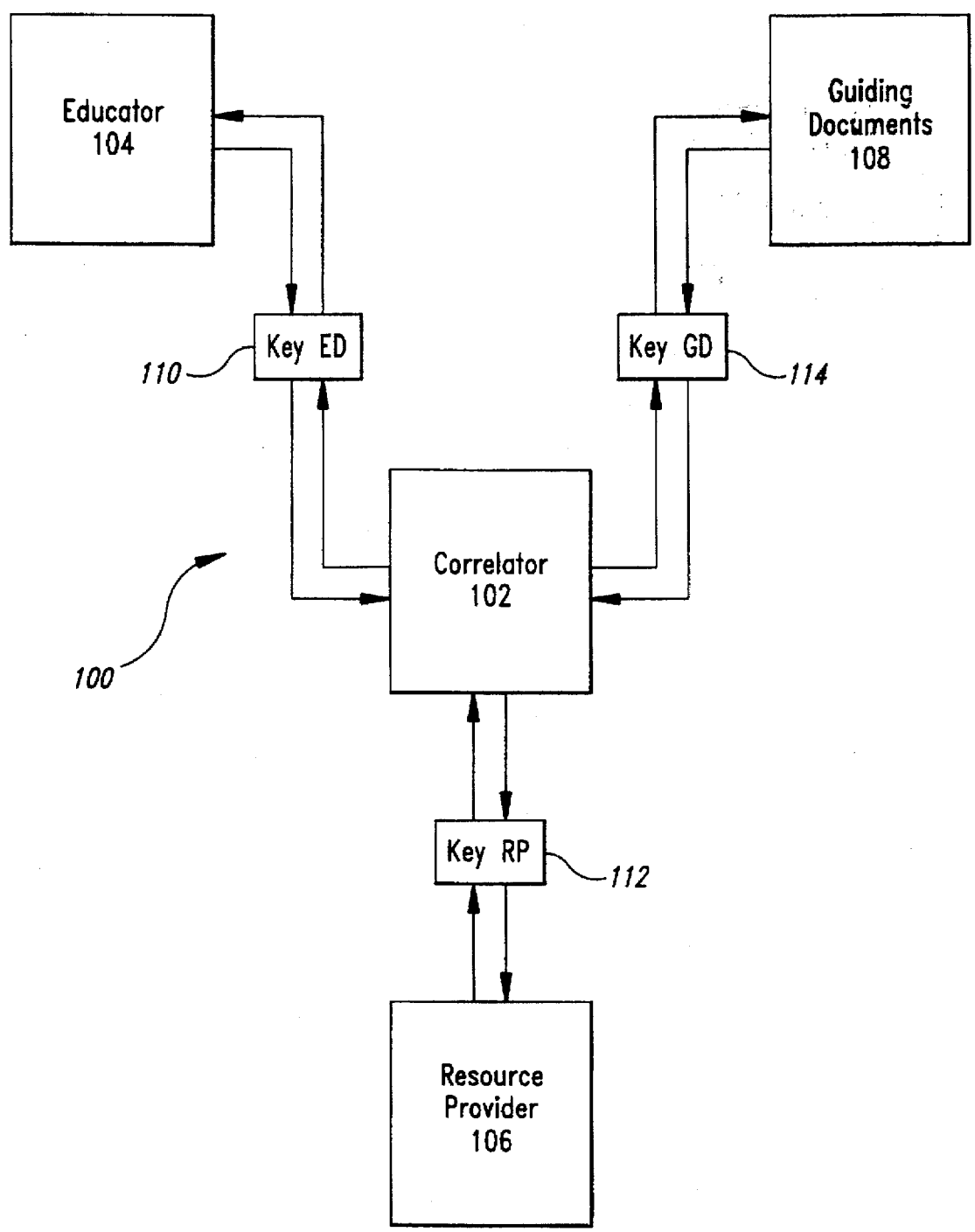
FIG. 1 is a schematic representation of a device for correlating educational requirements among guiding documents, educational programs, and educational resources.

As shown in FIG. 1, a correlation apparatus 100 includes a correlator 102 as a central unit. In the preferred embodiment, the correlating apparatus 100 is implemented on a conventional personal computer, with the correlator 102 being embodied in a software program. Because the correlator 102 is embodied in software, it may be transported among various computers, which may be used separately to perform the various operations discussed herein. Three input units, the educator input unit 104, resource provider input unit 106, and guiding document input unit 108 are linked to the correlator 102 via respective keys, KeyED 110, KeyRP 112, and KeyGD 114, respectively. The keys are correlative relationships stored in memory and implemented in software. The development and structure of the three keys, KeyED 110, KeyRP 112, and KeyGD 114 is discussed herein with respect to FIGS. 4a–6b.

As can be seen from FIG. 1, the correlator 102 within the correlation apparatus 100 provides a central link through which each of the input units 104, 106, and 108 is able to obtain information concerning each of the other input units. The correlator 102 includes a central knowledge base 202 containing several discrete informational strings 207 to which inputs from each of the input units 104, 106, and 108 may be correlated (see FIGS. 2 and 3). The discrete informational strings 207 are conformed elements describing particular aspects of an educational field. The elements are preferably implemented as discrete statements 207.

The statements 207 are pre-established content and process knowledge statements relating to a particular topic or topics, or to a general field or fields of study. The statements 207 are classified in three categories in the knowledge base 202, statements about conceptual understandings, process statements, statements relating to skills, tools and fact knowledge. The statements may also be classified according to class level. The knowledge base statements 207 provide a conformed list of elements of a study area to which each of the input units 102, 104, and 106 may be correlated. The elements may vary from narrow statements regarding a particular area of study, such as, "Inertia is the tendency for an object to resist changes in motion," to broad global statements relating to areas of study, such as "Customary metric units for speed are m/s and km/h." The statements may also pertain to specific facts, such as, "When an object is moving, the speed will be other than zero," or may pertain to abstract concepts such as, "Descriptions or pictures of a series of events can be placed in chronological order."

The statements within the knowledge base 202 are described as a conformed group of elements. That is, they are a set of statements describing, at a selected level of detail, the elements of a given area of study, such as science. In the preferred embodiment, the statements 207 encompass all of the statements required to cover the entire area of study for a curriculum extending from kindergarten through twelfth grade.

FIG. 3 presents a portion of one embodiment of the knowledge base 202 giving some examples of statements 207 within the knowledge base 202. Of course, it could include history, geography, math, or any other concepts to be taught. That is, the knowledge within the knowledge base 202 pertains to any aspect of education in the classroom. The selected statements 207 in the portion 204 in this example relate to a limited area of a general science knowledge base as an example. As can be seen from FIG. 2, the portion 204 is only a sample of the information in the knowledge base 202. Such knowledge bases may also be directed to other topics, such as mathematics, social sciences, and English. It will also be understood that in some applications, it may be desirable to create knowledge bases pertaining to just one topic, or many topics. Multiple knowledge bases would be particularly useful in correlating aspects of multi-topic education, such as correlating resources and educational plans for physics and mathematics.

Figure 2:
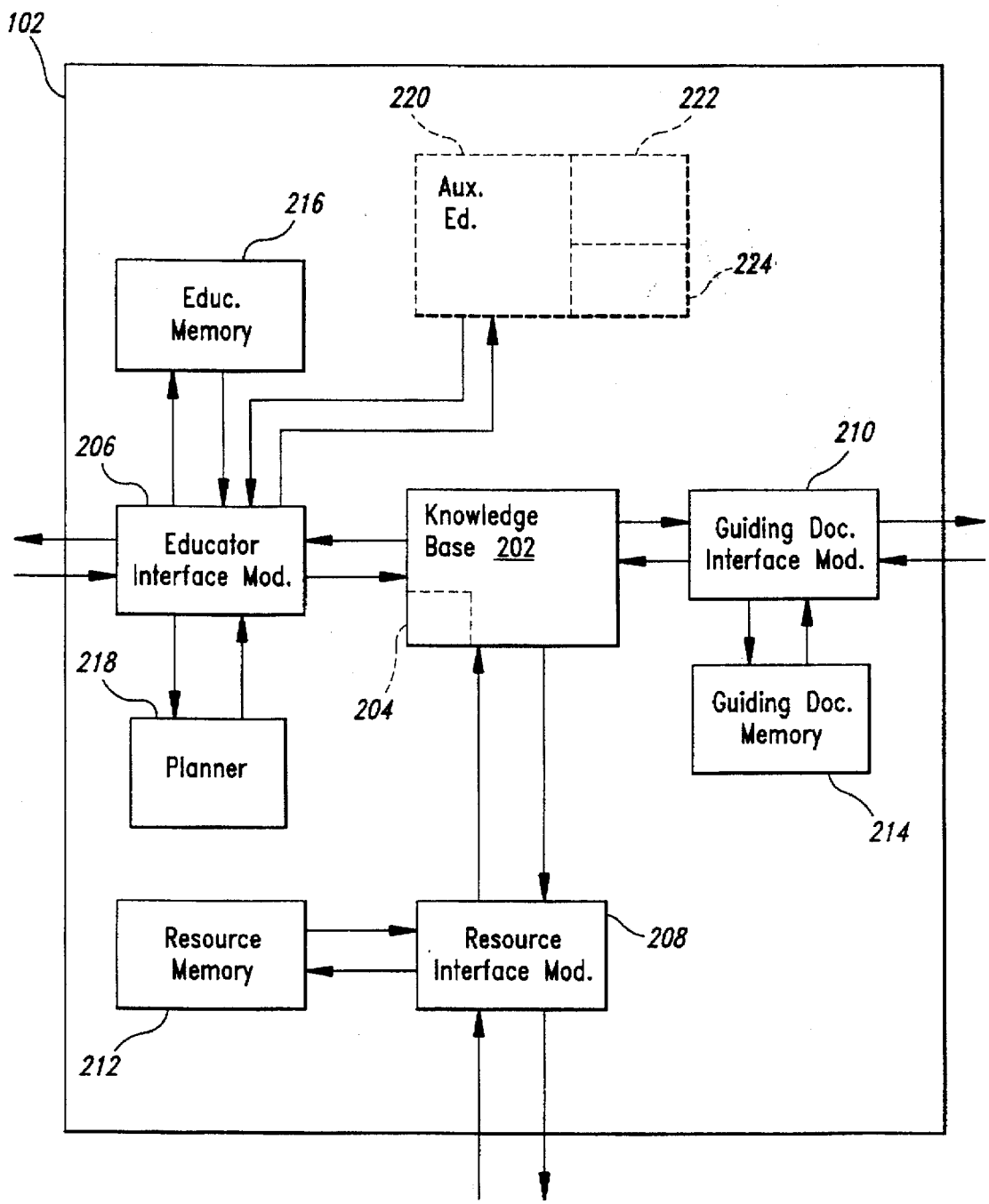
FIG. 2 is a schematic representation of the correlator of FIG. 1 including the knowledge base.

As can be seen in FIG. 2, informational transfers between the knowledge base 202 and the various input units 104, 106, 108 is controlled by respective interface modules 206, 208, and 210. In the preferred embodiment, these modules are software routines which enable users to access and retrieve information within the knowledge base 202 and to provide data for use in the knowledge base 202, such as data identifying specific groups of information related to a given topic. Each of the input units 104, 106, and 108 is linked to the knowledge base 202 through their respective interface modules 206, 208, 210. Components in each of the educational programs, resources, and guiding documents are bidirectionally correlated through their respective keys, KeyED 110, KeyRP 112, and KeyGD 114, respectively.

Figure 4A:
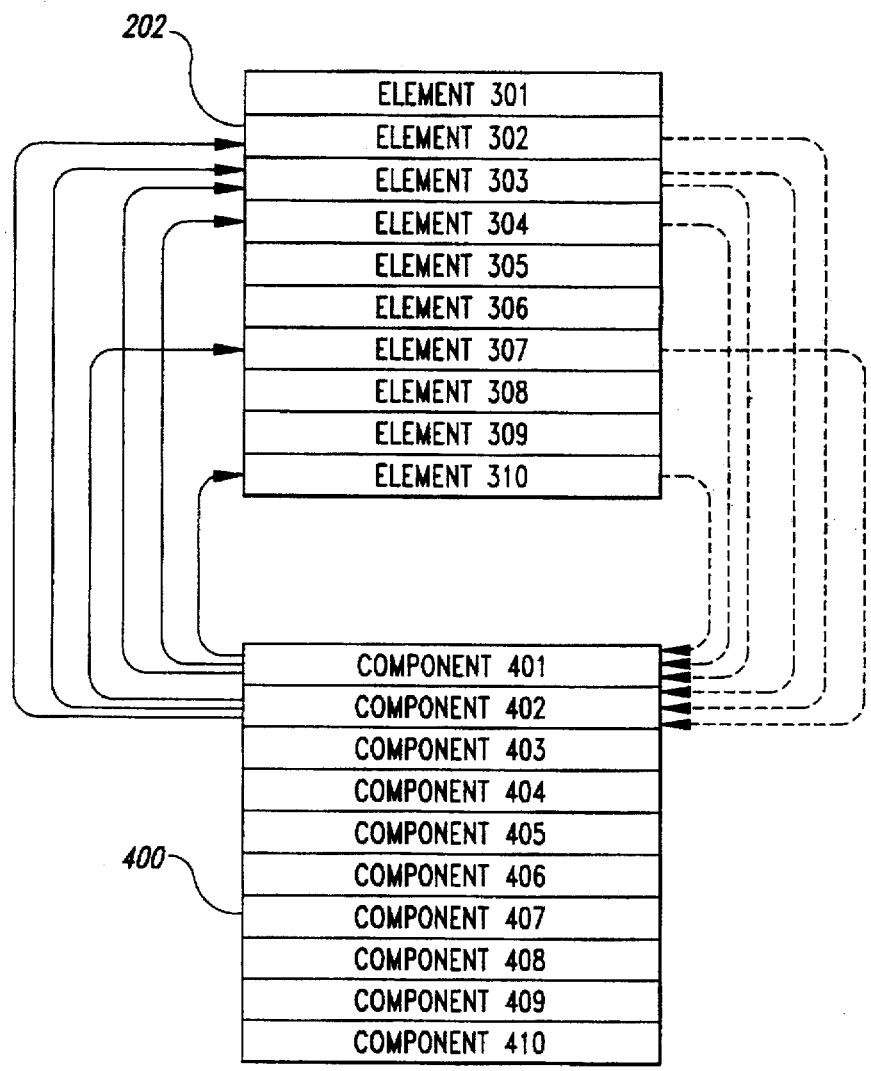
FIG. 4a is a diagrammatic representation of the correlation between components of a resource and elements of a conformed central knowledge base.

FIG. 4a shows the development of a KeyRP 112. It will be understood that the representation of FIG. 4a is a diagrammatic representation of the development of the interrelationships between a resource 400 and the knowledge base 202. The resource interface module 208 and other hardware and software aspects of the correlation apparatus 100 through which these interrelationships are input and stored are therefore not shown in FIG. 4a for ease of presentation. Also, in the representation of FIG. 4a, only ten of the statements 207 within the knowledge base 202 are presented, each as a separate element 301–310.

The resource 400 to be input to the resource provider input unit 106 includes ten resource components 401–410. While the resource 400 is shown as including ten components, this number will vary depending upon the particular resource. For example, if the resource 400 is an extended educational video disk covering several topics, there may be many more than ten components. On the other hand, if the resource 400 is a specific figure, graph, or experiment showing an isolated educational component, the number of components may be as few as one.

In the preferred embodiment, the correlation between the particular resource 400 and the knowledge base 202 is created by a user who provides the resource, the resource provider. The user may be any resource provider such as a textbook publisher, educational material provider, or teacher. To establish this correlation, the resource provider selects each of the individual components 401–410 within the resource 400 and, for each component 401–410, identifies one or more elements 301–310 within the knowledge base 202 as corresponding to the component. For example, as shown in FIG. 4a, component 401 is selected by the user as correlating to elements 303, 304, and 310. An example of such a correlation might involve a resource such as a classroom experiment where expansion of a material is measured as a function of temperature. In such an example, the component 401 might be heating of a material and monitoring of the temperature. Elements 303, 304, and 310 might be "heat is energy," "as heat is applied, temperature rises," and "temperature may be measured with a thermometer," respectively.

Similarly, for component 402, the resource provider identifies a second set of elements, element 302, 303, and 307, respectively, which correlate to component 402. For simplicity of presentation, the correlation in FIG. 4a between the resource 400 and the knowledge base 202 is shown only for components 401 and 402. It will be understood that a complete representation of the correlation would include similar indicators showing correlations between the remaining components 403–410 and the elements 301–310 in the knowledge base 202.

Figure 4B:
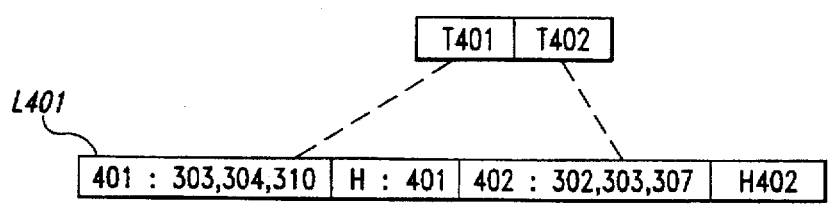

Upon identifying correlations between the components 401–410 in the resource 400 and the elements 301–310 of the knowledge base 202, the resource provider (106) inputs these correlations into the correlation apparatus 100 via the resource interface module 208. The resource interface module 208 is typically a software routine on a personal computer or workstation. As shown in FIG. 4b, the correlator 102 stores this correlation in the form of linked lists L401, L402 within a resource memory 212 (FIG. 2) associated with the correlation apparatus 100. For example, the resource memory 212, may be a computer disk or similar storage medium.

Header H401, H402 are also stored with the linked lists L401, L402. The header H401, H402 may include supplemental information, such as information concerning the knowledge base 202 or the resource 400. For example, the header H401 may include the revision number of the knowledge base 202 or descriptive information about the resource 400, such as whether it is a demonstrative exhibit, videotape, textbook, or other form of resource. Together, the linked lists L401, L402 and the headers H401, H402 form the key KeyRP.

Additionally, templates T401, T402 indicating that the resource component 400 is within a particular subgroup may be associated with the linked lists L401, L402. The templates T401, T402 are preferably stored in a separate portion of the storage medium from the linked lists L401, L402. For example, selected components within the resource 400 may be grouped under the classification "environmental sciences." The template T401 would then indicate the components pertaining to environmental sciences. The templates would also include pointers to the elements in the knowledge base 202 correlated to the selected components related to environmental sciences. The templates T401, T402 enable apparatus to identify quickly all components within such subgroups.

The key KeyRP is stored within a resource memory 212 (FIG. 2), which may be a memory location within the correlation apparatus 100 or a separate storage medium, such as a computer disk.

As can be seen from the discussion thus far, the resource provider has created a unidirectional correlation, that is, the resource provider has identified the correlations between individual components 401–410 of the resource 400 and elements 301–310 of the knowledge base 202. When the resource provider has completed its entry of the unidirectional correlation, the correlator 102 can determine a bidirectional correlation between the knowledge base 202 and the resource 400 based upon the unidirectional correlation provided by the resource provides. That is, the correlator 102, using the KeyRP 112, can identify correlations between each of the individual elements 301–310 and the components 401–410 of the resource 400.

In FIG. 4A, for example element 302 correlates to component 402. Similarly, element 303 correlates to components 401 and 402. In the actual implementation of this apparatus, the correlator 102 does not actually produce the bidirectional correlation until a complete set of unidirectional correlations has been developed. This permits the resources of the correlation apparatus 100 to be applied more efficiently.

Figure 5A:
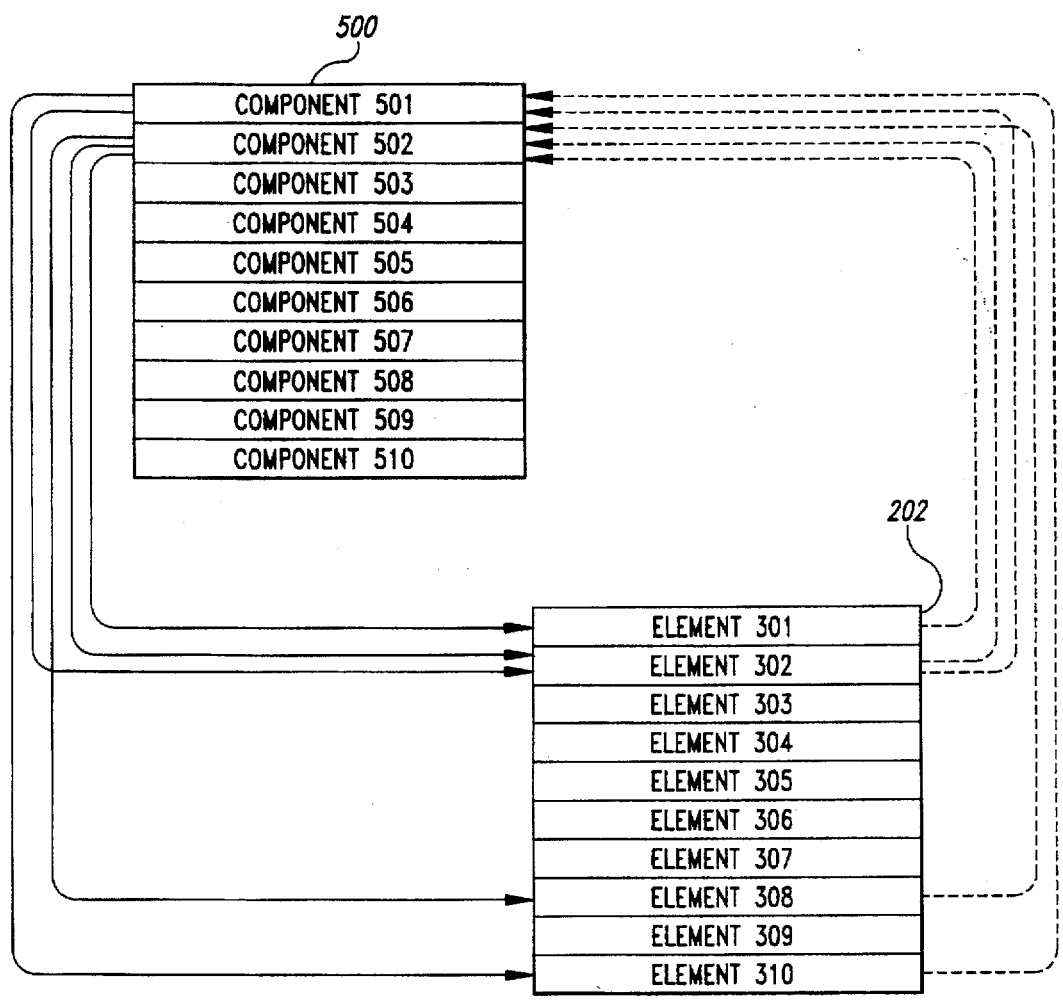
FIG. 5a is a diagrammatic representation of the correlation between components of an educational program and elements of the conformed central knowledge base.

As shown in FIG. 5a, an educator creates a unidirectional key KeyED similar to that of the resource provider by selecting components 501–510 in an educational program and correlating to selected ones of the elements 301–310 in the knowledge base 202. The educational program may be a course curriculum, particular lesson, teaching plan, or other similar educational program or may be a more general educational program, such as an outline of recommended physics curricula produced by a school administration. The educational program may be established by the individual teacher, or may be established by some other entity, such as a school or school board or corresponding to a program provided curriculum provider, such as an independent textbook provider.

As shown in Figure the educator enters, either directly or by importing from a pre-produced unidirectional correlation, the unidirectional correlation identifying correlations between individual components 501–510 and elements 301–310, using the same techniques as described with respect to FIGS. 4a and 4b. The educator also enters headers H501, H502, which, together, with the unidirectional correlation form the key KeyED. The correlator 102 can then identify the reverse correlation for each individual element 301–310 between the elements 301–310 and the components 501–510, as indicated by the broken arrows. The bidirectional correlation between the components 501–510 and the elements 301–310 will be produced from the key KeyED 110 when the correlation apparatus 100 is initialized by the educator.

As before, the unidirectional correlation is stored in the form of linked lists L501, L502 having headers H501, H502. The linked lists L501, L502 are stored in an educational memory 216 (FIG. 2) which may be within the correlation apparatus 100 or on an external storage medium, such as a computer disk. Templates T501, T502 are stored in a separate memory to indicate various groupings of selected educational components 501–510 and pointers indicating the elements 301–310 correlated to the selected components.

It is instructive to observe the relationships between the individual components 501–510 of the educational program 500 and the components 401–410 of the resource 400. Considering, for example, the second component in the educational program 500, component 502, it can be seen that component 502 correlates to element 302. Following the reverse correlation between element 302 and the resource 400, it is seen that element 302 correlates to component 402. Thus, it can be seen that component 402 of the resource 400 may be utilized by an educator to present component 502 of the educational program 500. Because component 402 also correlates to element 302, it can be seen that component 402 also relates to component 502. Similarly, element 302 relates to component 501. Thus, component 402 of the resource 400 is applicable to both components 501 and 502 of educational program 500.

Figure 6A:
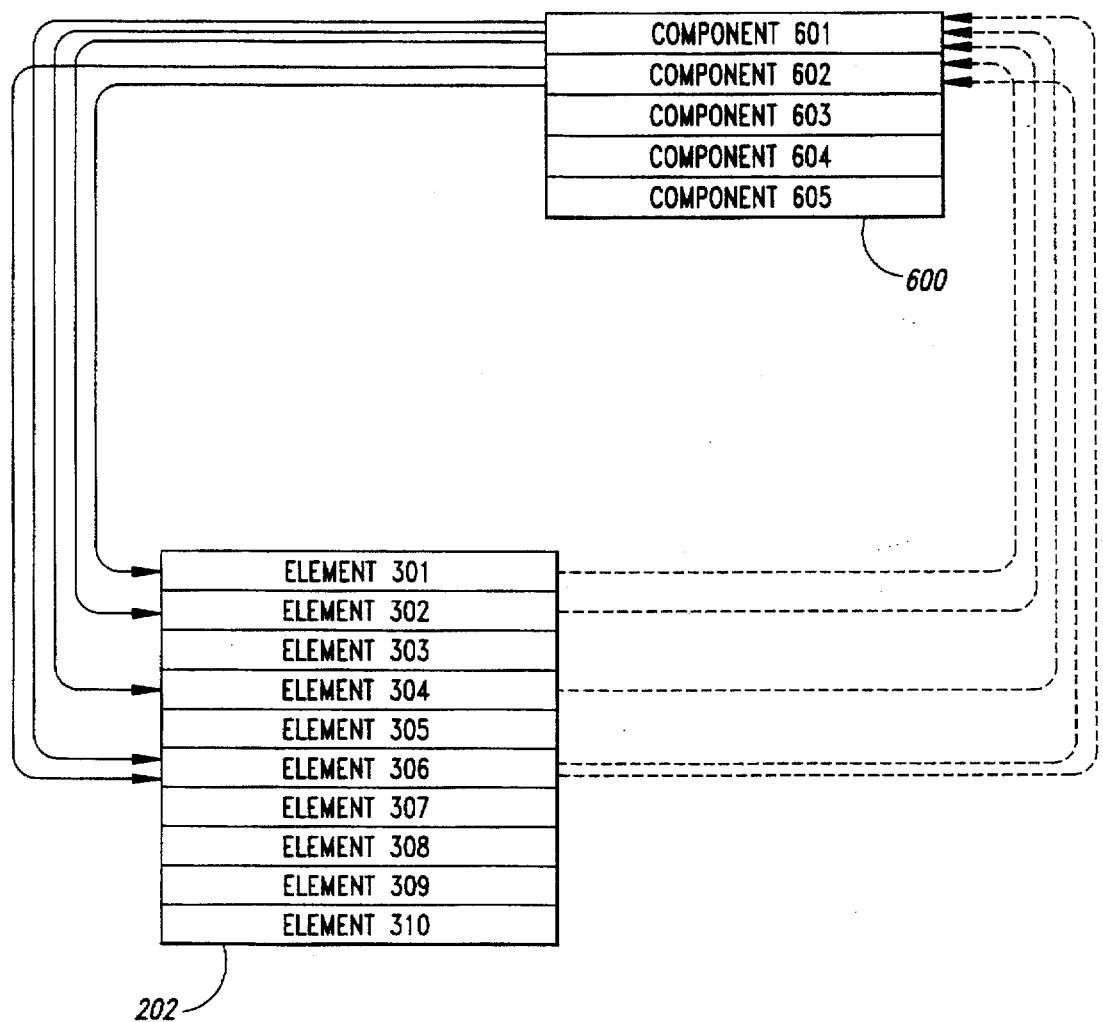
FIG. 6a is a diagrammatic representation of the correlation between components of a guiding document and elements of the conformed central knowledge base.

FIG. 6a shows the creation of the guiding document unidirectional correlation. A particular guiding document 600 contains several components 601–605. While only five components are shown, it will be understood that, commonly, guiding documents will incorporate much more than five components. For example, the 1990 Science Framework of California Public Schools, Kindergarten through Grade 12, is a book containing over 200 pages, with most of the pages having several components each. The reduced number of components in FIG. 6a is presented for clarity of presentation.

As before, for each of the components 601–605, the producer of the component, in this case, the guiding document producer, identifies elements within the knowledge base 202 correlating to each of the components 601–605. Again, for clarity of presentation, correlations are shown only for the first two components 601, 602. It will be understood that similar correlations will be developed for every one of the components 601–605.

As the guiding document producer identifies each of the correlations and inputs them to the correlator 102, the correlator produces linked lists L601, L602 identifying the respective correlations. As before, the linked lists L601, L602 and associated headers H601, H602 identifying specific features of the knowledge base, such as its version number, date of modification, or various other identifying aspects, form the key KeyGD.

The linked lists L601, L602 are stored to a guiding document memory 214 (FIG. 2) which may be within the correlation apparatus 100 or may be a separate storage medium such as a computer disk. While the educational memory 216 is shown as being within the correlator 102, in actual implementation it will often be desirable to store the linked list on a separate storage medium, such as a computer disk, so that the information relating to the particular guiding document 600 may be provided to several educators or resource providers for use with a particular correlator 102.

As before, the correlator 102 can produce a bidirectional correlation from the unidirectional correlation. Again, the bidirectional correlation is produced upon initialization operation of the correlation apparatus 100 by a user, as dictated by efficiency concerns. Templates T601, T602 are stored in separate memory locations and provide indications of grouping of components 601–605 and pointers to correlated elements 301–310 in the knowledge bus 202.

Figure 5B:
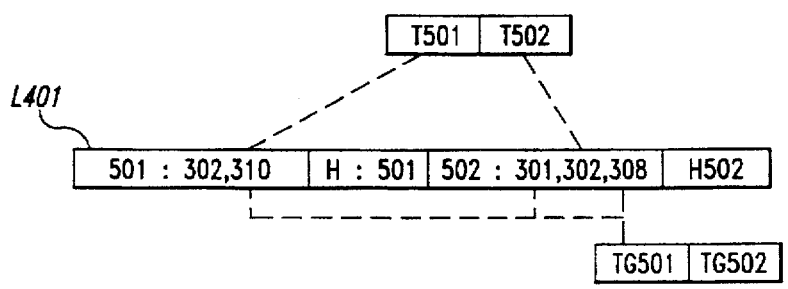
Figure 6B:
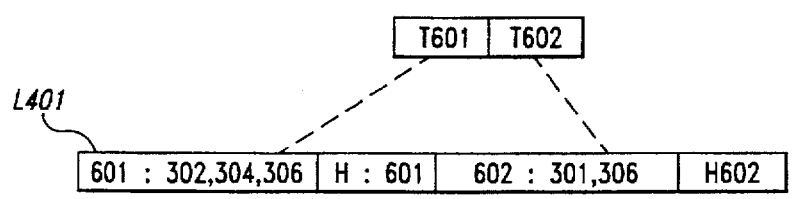

Only the linked lists of FIGS. 4a, 5b and 6b necessary to describe the unidirectional correlations are stored on the respective memories 212, 214, 216 along with their corresponding headers H401, H402, H501, H502, H601, H602. When the apparatus is activated, the reverse correlations (indicated by the broken arrows in FIGS. 4aa, 5, and 6) are derived from the stored linked lists L401, L402, L501, L502, L601, L602. The bidirectional correlations may then be stored to disk or to RAM. This reduces the amount of memory required to store the bidirectional correlations 110, 112, and 114 when the apparatus is inactive, and reduces delays and data transfer problems associated with updating each of the bidirectional correlations.

When the full set of bidirectional correlations is produced, the correlator 102 can identify and correlate each of the sets of components 401–410, 501–510, and 601–605, through the knowledge base 202 in the manner discussed above with respect to identification of resource component 402 to educational elements 501 and 502. This allows the correlator 102 to identify the particular guiding document components (requirements) 601–610 related to by specific elements 501–510 of educational program 500, and to identify resource components 401–410 appropriate to present the elements 501–510 of the educational program 500 and has those resource components 401–410 satisfy the requirements of the guiding documents.

In the preferred embodiment of the invention, the correlator 102 provides output to a user through a variety of interactive presentations. In addition to providing direct correlations of the various components 401–410, 501–510, and 601–605, the correlator 102 also incorporates a time-linked planner 218 (FIG. 2) to permit the educational elements to be incorporated in a time-referenced manner such as a course plan. The educational interface module 206 (a software program, as discussed above) provides several menu-driven options to the educator, as shown in the menu navigational map of FIG. 7. The use of assorted menus and software enabling users to select various menus and menu configurations is well known in the art. The menus and menu controlling software are stored in an auxiliary educational memory 220 (FIG. 2).

While the use of the correlation apparatus 100 has been described thus far from the perspective of use by an educator, the correlation apparatus 100 is also used by resource providers to identify correlations between the resources offered by the resource providers and the guiding documents. The resource provider, after identifying components 401–410 of the educational resource and their correlation to elements 301–310 of the knowledge base 202, may examine how the components correlate to the components 601–605 of the guiding documents. This example assumes that the components 601–605 of the guiding documents have been correlated to the knowledge base 202 and that the text of the guiding documents is stored in a memory accessible by the correlation system 100.

Using a menu driven selection, the resource provider can select specific components and identify the components 601–605 to which the particular resource correlates by examining the components 401–410. In a systematic fashion, the resource provider can identify components 601–605 correlated to the resource. Thus, the correlation system 100 allows the resource provider to provide a concrete indication of the applicability of resources offered by the resource provider to the criteria established by the guiding document provider. Also, the resource provider may identify those components of the guiding documents which are not satisfied by the resource to identify "holes" in the resource. The correlation system 100 thus provides a tool for use by the resource provider in identifying weaknesses and strengths of the resource to aid in designing and/or modifying resources.

Figure 7:
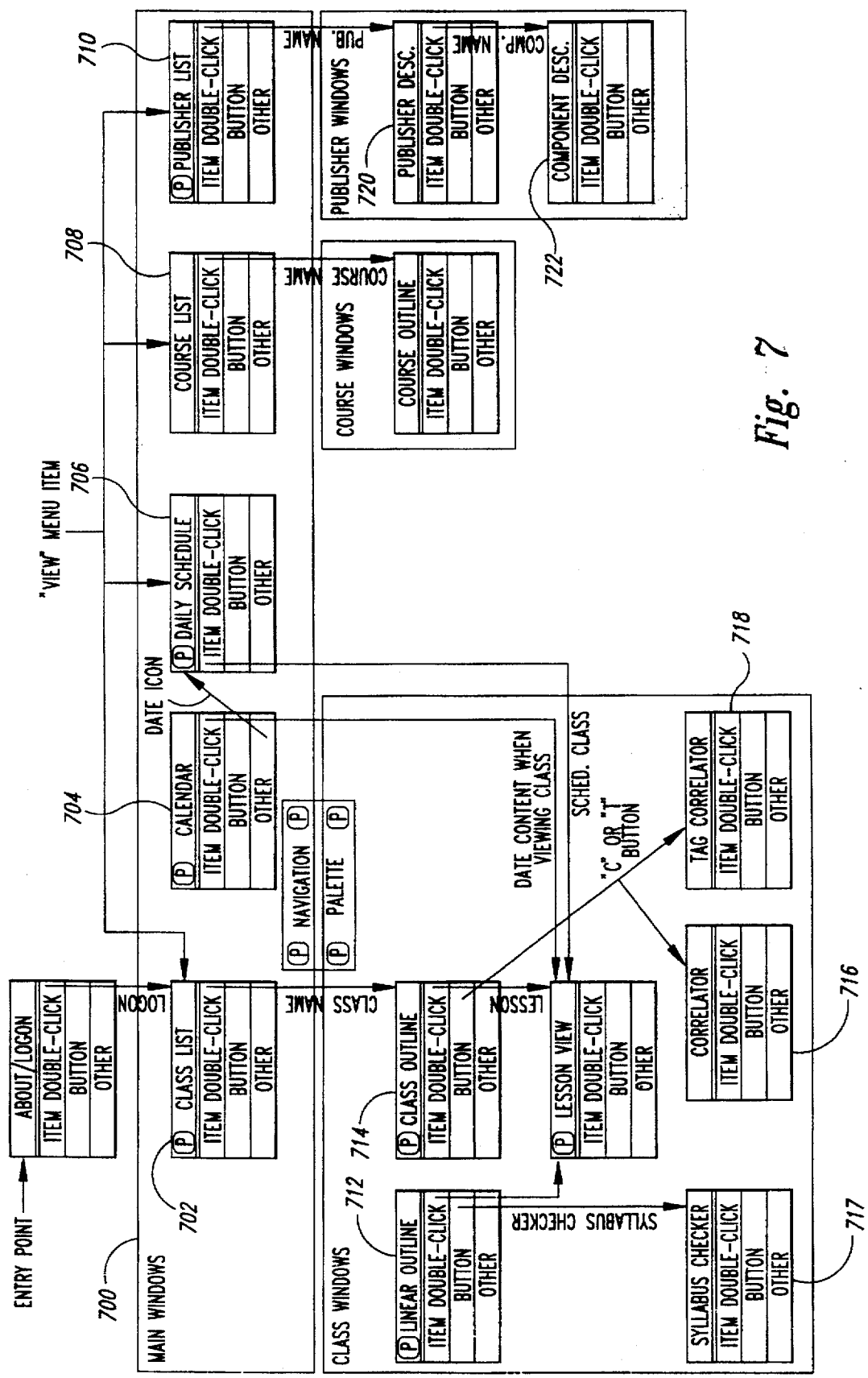
FIG. 7 is a menu map representing possible presentations of correlated data and educational calendars to a user.

Several different menus and correlation options may be chosen by the educator or resource provider. The following discussion focuses on menus available to the educator; but, the concepts apply also to use by the resource provider or guiding document provider. As shown in FIG. 7, the main windows 700 include a class list block 702, calendar block 704, daily schedule block 706, course list block 708, and publisher list block 710. Following the various navigation paths, the educator can access outlines of classes and courses blocks 712, 714 or the syllabus checker 717, or can identify correlations to various components of the guiding document or educational resources block 716. Similarly, the user can identify subgroups by searching using tags and correlating block 718.

Following an alternate path, the user may review information relating to resources and components of resources, blocks 720 and 722, respectively.

As discussed above, the unidirectional correlations are established by the educator, resource provider, and guiding document provider for their respective components 401–410, 501–510, 601–605. In each case, the educator, resource provider, and guiding documents provider select various elements 301–310 from the knowledge base 202 and indicate them as correlating to specific components of the educational program 500, resource 400, and guiding document 600, respectively. In each case, the same series of steps establishes the correlation. The following discussion relates generally to this process. The educator, resource provider or guiding document provider, as the case may be, will be referred to as the operator, for purposes of this description.

Figure 8:
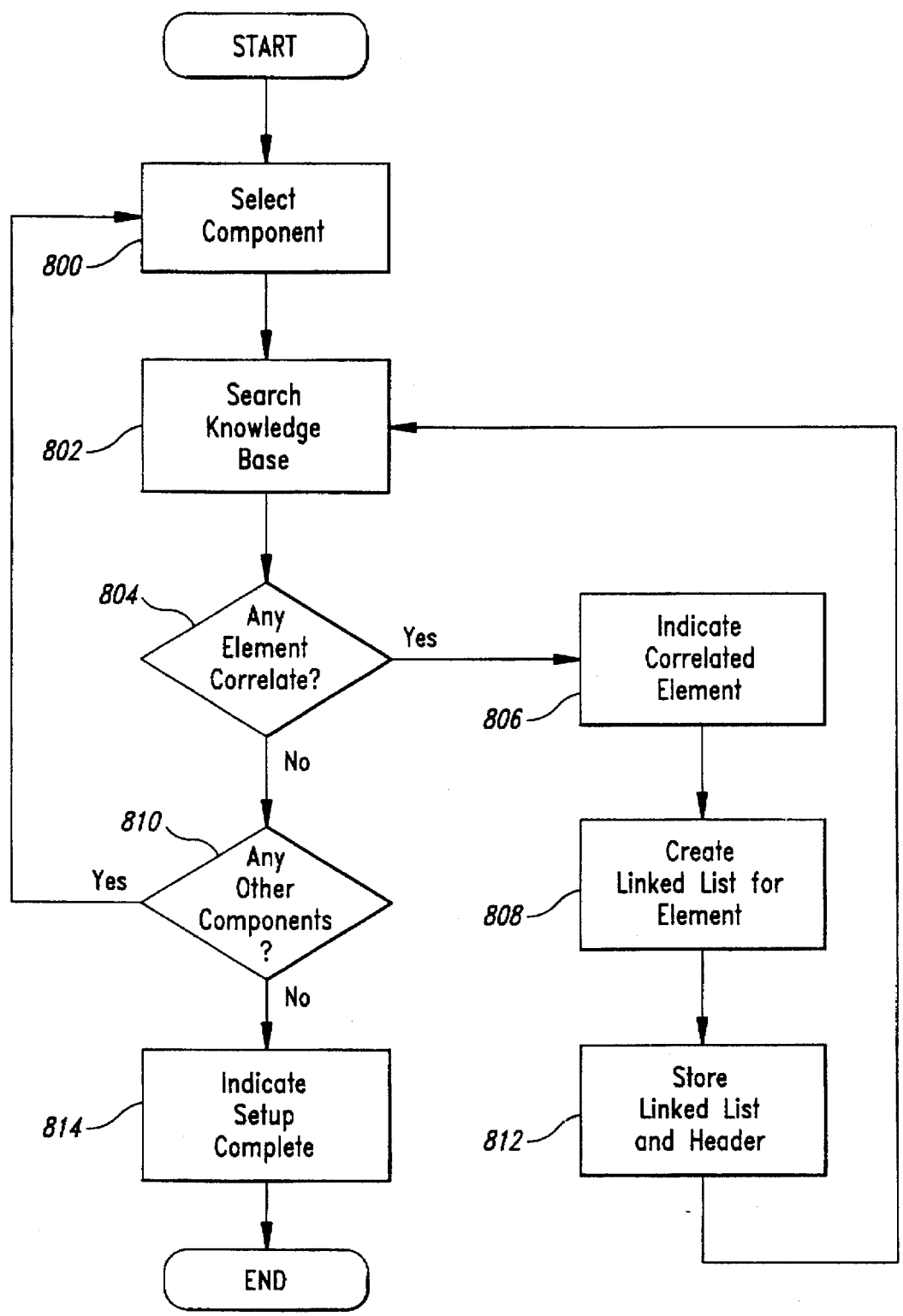
FIG. 8 is a flowchart outlining the steps in establishing correlation between components of a guiding document, resource, or educational program and elements in the conformed central knowledge base.

As shown in FIG. 8, the operator first selects a component from the appropriate set of components (educational program 500, resource 400, or guiding document 600), step 800. The operator then searches the knowledge base, step 802, and determines if any element correlates to the component. The correlation is determined subjectively by the operator. Advantageously, this allows the person most familiar with the specific component to identify the most appropriate correlations. For example, the provider of the guiding documents determines which of the elements within the knowledge base 202 correlates to each specific component of the guiding document.

When the operator identifies a correlated element, step 804, the operator indicates that there is a correlation, step 806, typically by clicking on a selection using a mouse. The correlator 102 then creates a linked list and header, of the type shown in FIGS. 4a, 5b, and 6b, that corresponds to the indicated element, step 808, and stores the linked list and header to memory. If specific templates are also indicated by the user, the correlation system 100 modifies one or more templates.

The operator then continues to search the knowledge base 202 to identify additional elements which correlate to the component, step 802. After the operator has identified and selected all of the appropriate elements that correlate to the component, the operator then determines if there are any additional components to correlate, step 810. If any other components remain, the operator selects the next component, step 800, and continues the process. If no further components remain, the operator indicates that the initial setup of the correlation is completed.

After the setup indicated in FIG. 8 is complete for each of the educator, resource provider, and guiding document provider, the bidirectional correlation and cross-correlation between components of the educational program, guiding document and/or resource may be performed. It should be noted that, while each of the educator, resource provider, and guiding document indicated and described herein as a single set of components, the correlator may include several sets of linked lists, each relating to a different set of components. For example, where several textbooks and other educational resources are available, each may be correlated by the appropriate resource provider and a set of linked lists established for each of the resources. Similarly, more than one guiding document may apply to a given educational program. For example, state educational guidelines and local school board guidelines may both impact educational programs.

The correlation apparatus is typically used by an educator after the multiple guiding documents and multiple educational resources have been correlated to the knowledge base. The text of each of the guiding documents is assumed available on a data Storage medium and this text may be retrieved for presentation to the user.

Figure 9:
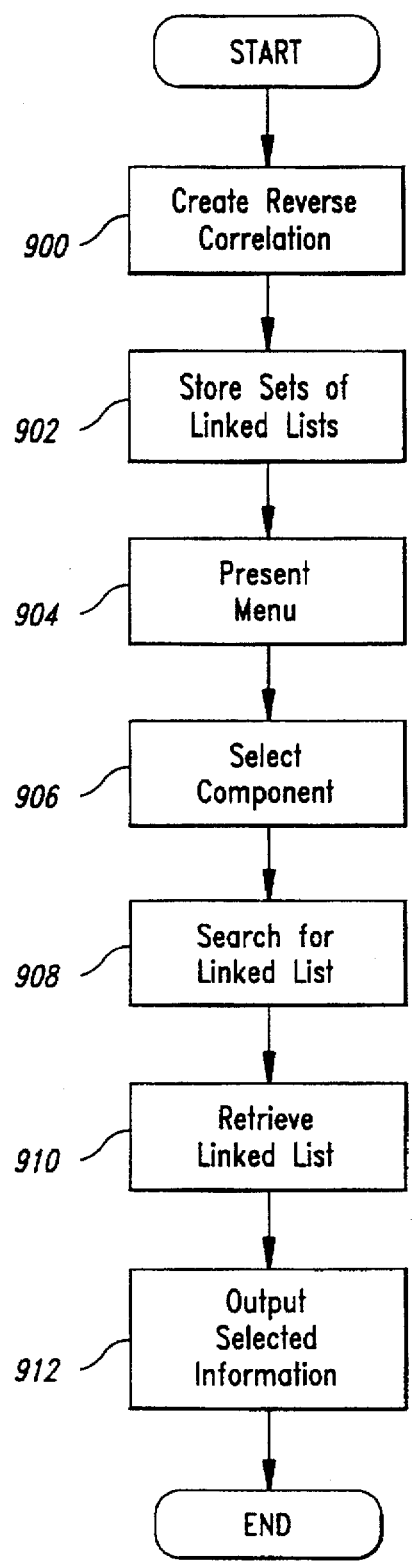
FIG. 9 is a flowchart describing the creation of a bidirectional correlation from a key.

As shown in FIG. 9, upon initiation of the program the correlator 102 creates a reverse correlation, step 900, to identify, for each element correlated to the selected component, the elements in each of the sets of components corresponding to the educational resources 400, and the guiding documents 600. The correlator then stores the sets of linked lists, with headers, in a local memory, step 902. The user then selects a menu (step 904) as described above with respect to FIG. 7. When a user selects a component from the menu, step 906, the correlator searches the educational memory 216, step 908, and retrieves the linked list, step 910, corresponding to the selected component. Based upon the retrieved linked list, the correlator 102 identifies the appropriate information for the selected menu and outputs selected information to the user, step 912, in response to the menu selections.

Figure 10:
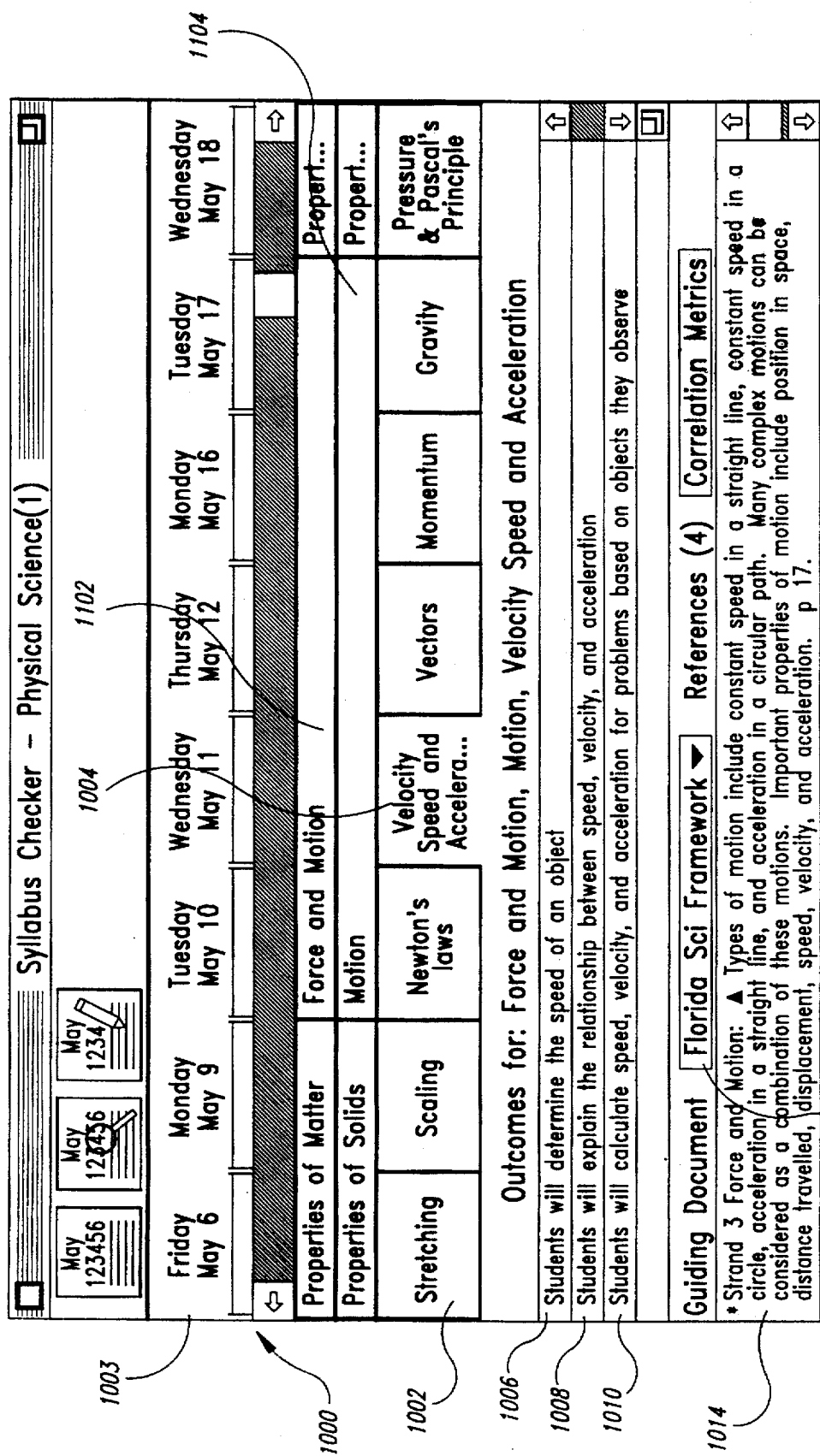
FIG. 10 is a output screen display showing presentations of correlation between elements of an educational plan and components of a guiding document.

By selecting among the various screen presentations, the educator can develop an educational plan using a linear view of a schedule of lesson 1002 FIG. 10), calendar views of a curriculum, or a daily calendar. The linear view of the schedule of lesson 1002 shows the timing flow of a course without the constraints of a calendar establishing the amount of time that should be spent on each part of the educational program though a calendar index 1003 can be displayed simultaneously as in FIG. 10. The calendar view allows a day-by-day view of the curriculum that appears like an actual Days Of The Week Calendar. The educator can choose to view by full year, month, week, day of the week or unit of instruction or may present multiple non-sequential days. The unit of instruction view is presented in FIG. 13. The daily calendar presents an hourly schedule in which the educator can add its own activities and reminder notes. These blocks of time and notes could include reminders of where a lesson left off the previous day or outside classroom activities like parent conferences or staff meetings. In a multi-user network, the daily calendar is made available to others on the network.

The correlation system 100 also allows the educator to apply tags TG501, TG502 (FIG. 5b) to various components 401-410 or groups of components in the educational program. For example, a teacher may identify selected components 401-410 as relating to a specific topic. The tags TG501, TG502 are educational program specific identifiers stored in the educational memory 216 identifying groupings of components 501-510, such as grouped portions of syllabi. For example, an educator may tag several lessons as relating to environmental sciences. The correlation apparatus 102 in response to selection by the educator generates pointers and stores them as the tags TG501, TG502. To review all elements relating to environmental sciences, the educator requests all components corresponding to the environmental sciences tag. In response, the correlator 102 indicates all of the components indicated by the pointers in the stored tag and displays them for the user.

The correlation apparatus 100 as used by the educator may be used on a lesson-by-lesson basis or in a more general fashion to plan or modify educational programs. In the output screen display 1000 of FIG. 10, for the schedule of lessons 1002, the educator may select one lesson 1004. This menu corresponds to the syllabus checker, block 717 of FIG. 7. The schedule of lessons 1002 is presented in this screen in a linear fashion beneath the calendar index 1003 to provide a timeline for the user. The specific lesson 1004 can be chosen by indicating the segment of the linear lesson plan 1002 which the user wishes to examine by clicking with a mouse.

The lesson 1004 includes the three educational components 1006, 1008 and 1010 to be taught, which are displayed as part of the screen 1000. Based upon the correlations having been performed as described with respect to the prior figures, the correlator 102 identifies specific guiding components 1014 of a guiding document 1020 (in this case, the Florida Science Framework) as being correlated to these educational components 1006, 1008, 1010. The display then indicates to the educator that the educational components 1006, 1008, and 1010 of the particular lesson 1004 correlate to the components 1014 of the guiding document 1020 through the knowledge base 202.

As shown in FIG. 11, the lesson plan 1002 may be presented as an outline 1102 according to topic with dates 1003, possible correlations 1005 and tags 1007 indicated. The outline also indicates the hierarchical position of the lesson 1004 in the outline and the components 1014 of the guiding document correlated to the higher level outline components 1102, 1104. This permits the user to review and plan, at various levels of specificity, an educational program. Various other viewing options such as calendar form may also be chosen to present the information.

Figure 12:
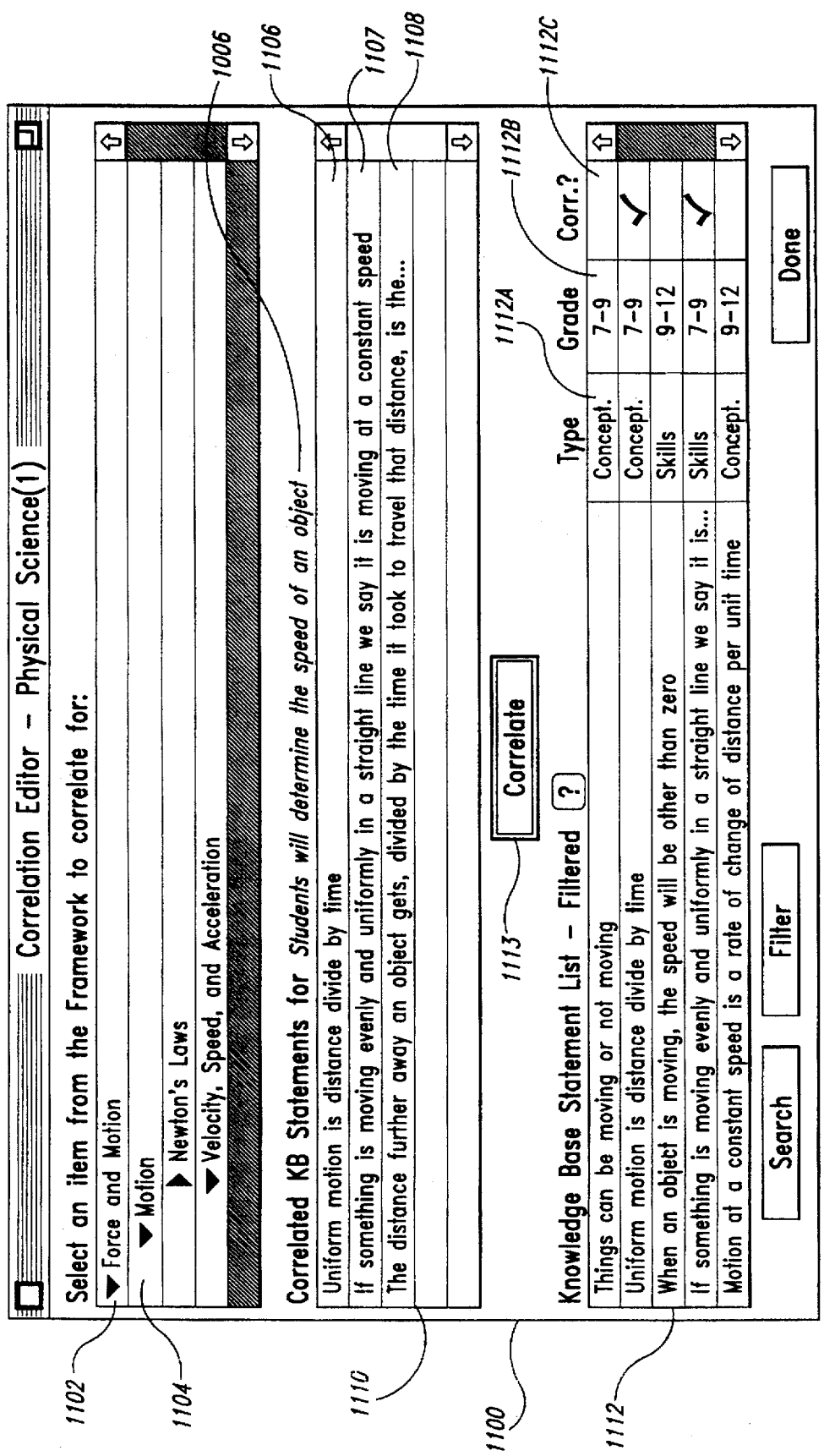
FIG. 12 is a output screen display showing a presentation of the correlation between components of a teaching plan and elements of the conformed central knowledge base.

Another informational correlation is demonstrated by the output screen display 1100 of FIG. 12. A portion of the screen 1112 displays statements (elements) from the knowledge base 202 along with additional information 1112A, 1112B, 1112C from the headers H4501, H4502. In this case, correlation is to the component 1006 "Students will determine the speed of an object." The educator selects elements from a knowledge base statement list 1112 as being correlated to the component 1006. The correlator 102 then displays the elements 1106, 1107, and 1108 of the knowledge base 202 to which the particular statement 1106 has been correlated.

In many instances this will be sufficient for the educator. However, the educator may also elect to modify the identified correlations between the elements and the components 501–510 of the educational program. To modify correlations, the user, for each component, selects elements from screen portion 1112 displaying the list of elements by highlighting the selected element by clicking on it with a mouse and then selecting the correlate function by clicking on the correlate indicated 1113. The linked lists are modified accordingly.

When the educator has completed the setup or modification of the correlation between the components 501–510 of the educational program 500 and the elements of the knowledge base, the educator can then use the correlation apparatus 100 to identify correlations to components of the guiding documents 600 and resource 400.

The educator requests a specific screen display according to the menu map of FIG. 7. If the reader selects the screen shot 1200 of FIG. 13, a particular lesson schedule is displayed. To create this display, the correlator 102 identifies elements in the knowledge base 202 correlating to selected components of the educational program, as described above with respect to the correlation between components of the educational program 500 and the resource 400 following the unidirectional correlation specified by the linked list L501, L502 and the reverse correlation derived from the linked list L401, L402. The correlator 102 then produces the display including information from the headers H501, H502 of the components of the educational program and the correlated resource components 1210–1218. In FIG. 13, three outcomes (components) 1006, 1008, 1010 of the educational program are shown for a specific lesson plan. The resources 1210–1218 are provided as suggested resources for the lesson.

As shown in FIG. 13, various identifiers are included in the headers H401, H402, H501, H502, H601, H602 of the various correlated elements. For example, each of the resources may include descriptions of activities 1218 in the lesson and an associated homework assignment 1220. The headers may also include an indication of whether the particular resource is a class participation, small group, hands-on or simulation type of resource as indicated in the teaching strategies window of the screen shot 1200. To modify the information in the headers, the user moves the cursor to a selected location, such as the lesson description 1218, and modifies the text. The modified text is then stored to the auxiliary educational memory 20 in place of the old header information. These three categories may be chosen from the teaching strategies window 1222.

Figure 14:
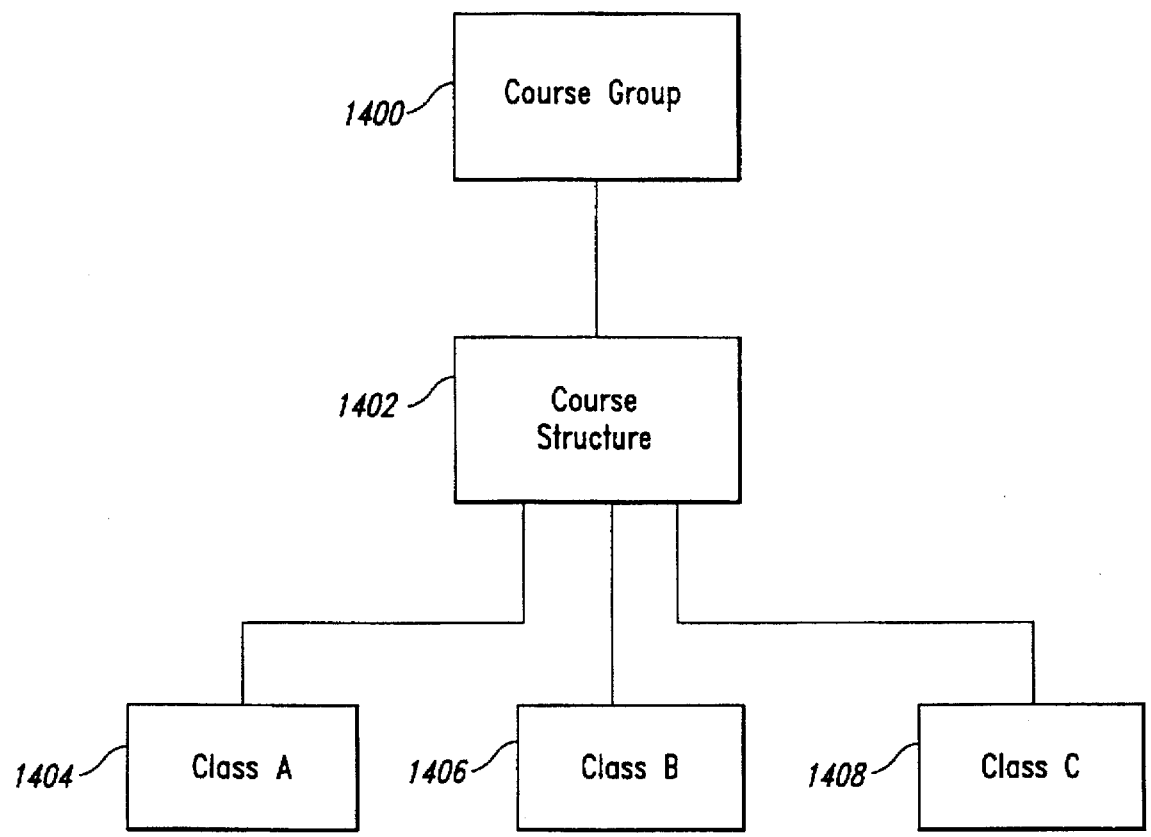
FIG. 14 is a diagrammatic representation of a hierarchical structure of course groups, course structure and individual classes.

The correlation apparatus 100 also allows the user to modify one or more educational programs simultaneously or to take modifications to an educational program and import them to one or more other educational programs by simultaneously modifying linked lists and/or components of multiple educational programs. Such transferring of program modifications is done on a hierarchical basis by utilizing a hierarchy according to course group 1400, course structure 1402 and individual classes 1404, 1406, 1408 (FIG. 14). As shown in FIG. 14, a single class structure is positioned beneath a course group 1400 in the hierarchy. The classes 1404, 1406, and 1408 are grouped under the single course structure 1402. The course structure 1402 may be a general course plan for a specific subject, e.g., eleventh grade science. Each of the classes 1404, 1406, 1408 is a particular implementation of the course structure, as it may have been modified during each presentation. For example, one class 1404 may be first period physics and a second class 1406 may be second period physics. Each of the sets of components corresponding to the respective classes ClassA, ClassB and ClassC is stored separately in the educational memory 216. The components of the classes 1404, 1406 may differ. For example, one or both of the classes 1404, 1406 may have been modified by the educator before or during presentation, perhaps due to discovery of a particularly effective lesson approach.

The course group 1400 is a higher level grouping of course structures. In the example above, for instance, the course group 1400 might be a school's course outline for physics, where the course structure 1402 would be an individual teacher's general course plan.

Figure 15:
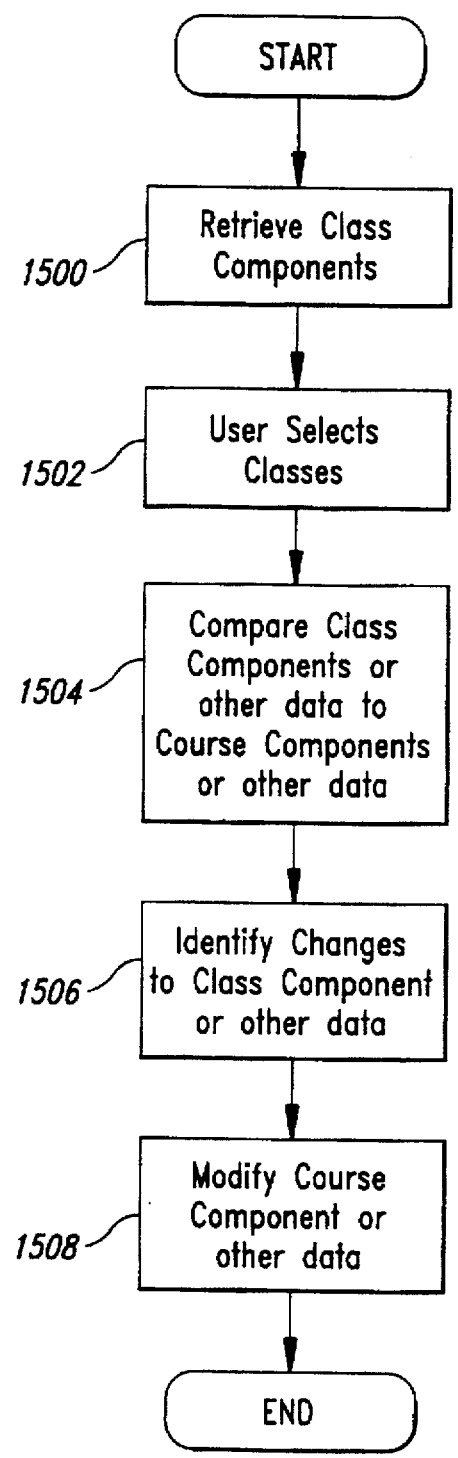
FIG. 15 is a flow chart presenting the importing of components from the class level of FIG. 14 to higher levels in the hierarchical structure.

A separate class modification module 222, implemented as a software routine, stored in the auxiliary educational memory 220 and implemented through the educational interface module 206 in the correlator 102 allows the user to modify the course structure 1402 by importing modifications from one or more of the classes 1404, 1406 and 1408, as shown in FIG. 15. The routine begins by retrieving components of the classes, step 1500. The user then selects a particular class, step 1502. The routine then compares the class components or other data (such as information in the headers or teachers' notes linked to particular classes) and compares them to the corresponding items of the course plan at the course structure level, step 1504. Any components to be changed are then identified by the user, or all changes may be selected in step 1506. Any selected changes to the course plan at the level of the course structure 1402 are made by substituting data from the class plan 1504, 1506 or 1508, into the corresponding location at the level of the course structure 1402, step 1508.

Figure 16:
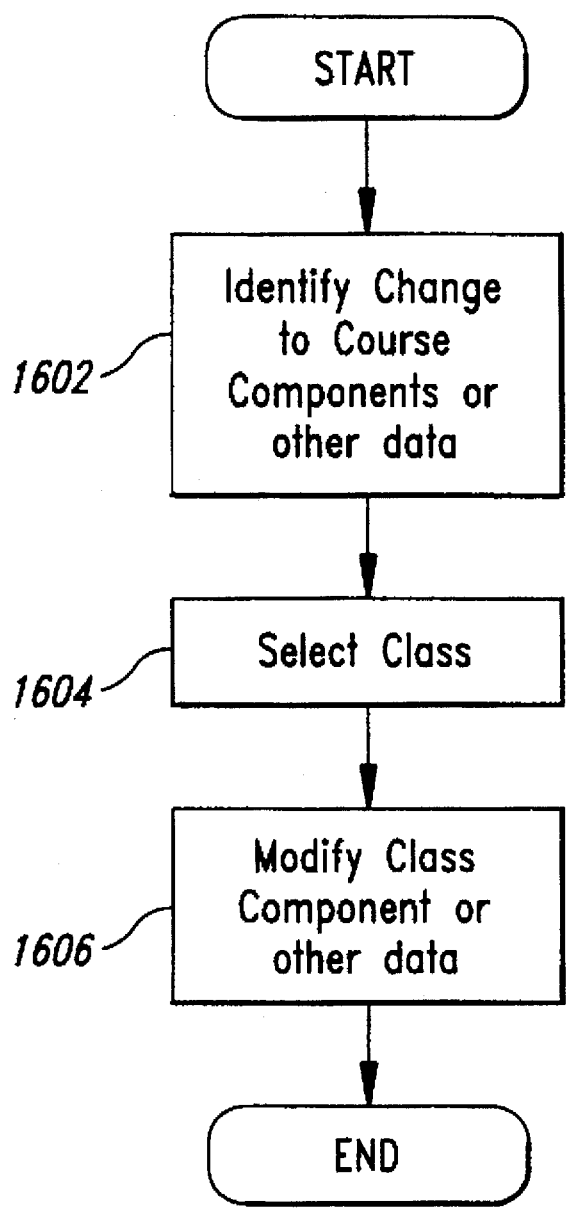
FIG. 16 is a flow chart presenting the importing of components from higher levels to lower levels in the hierarchical structure of FIG. 14.

If changes are to be made at the class level, either by importing changes from other classes, a similar sequence is followed (FIG. 16). While the example of FIG. 16 assumes that changes are made at the level of the course structure 1402 and imported to the classes 1404, 1406, 1408, a substantially identical process will be followed to transfer data from the level of the course program 1400 to the level of the course structure 1402. It is also noted that the changes at the level of the course structure 1402 may be made according to the process described with respect to FIG. 15. That is, the changes may be imported from one of the classes 1404, 1406 or 1408 to the level of the course structure 1402.

To transport information from the level of the course structure 1402 to the level of the classes 1404, 1406, 1408, a course modification module 224, stored as a software routine in the auxiliary educational memory 220 and implemented through the educational interface module 206, in response to selections by the user, identifies changes to course components or other data, step 1602. The user then selects a class into which the change is to be imported, step 1604. The routine then modifies the class component or other data, step 1606, by substituting corresponding information from the course plan at the level of the course structure 1402 into the selected class 1404, 1406, or 14081. If changes are to be made on a more global basis, that is, changes are to be made to multiple classes simultaneously, the last step, step 1606, involves substituting the information from the course plan at the level of the course structure 1402 into multiple classes 1404, 1406, 1408, rather than substituting information into the corresponding location of just one class.

It will be seen that by following the same procedure, information may be imported from the course group level 1400 to the course structure level 1402. The steps may then be repeated to transport the information down one step further to the level of the classes 1404, 1406, 1408. Thus, the class modification module 222 and the course modification module 224 may be used at all levels of the hierarchical structure of FIG. 15. While the above example has assumed that only a single course plan is at the level of the course structure 1402, it can be seen easily that multiple course plans may be at the level of the course structure 1402; and, each of the course plans may include multiple classes beneath them in a hierarchy. Such a structure would be advantageous in a networked system where, for example, changes are made at the school level and can be imported from the level of the course group 1400 to one or more course plans at the level of the course structure 1402. In such a structure, multiple teachers may access and import changes from a single course plan at the level of the course group 1400.

While several embodiments of the invention have been described, modifications to these embodiments and a combination of elements from different embodiments may be within the scope of the invention. For example, in a central server type of system, an educator may access the system to identify correlations between educational programs and guiding document components 601–605, while a resource provider may access the same system to identify correlations between a resource 400 and the guiding document components 601–605.

From the foregoing, it will be appreciated that, although embodiments of the invention have been described herein for purposes of illustration, various modifications may be made without deviating from the spirit and scope of the invention. Accordingly, the invention is not limited except as by the appended claims.

We claim:

1. A method, for correlating educational requirements, of retrieving components of guiding documents correlated to a component of an educational program schedule, said method implemented on a computer system having an electronic controller, comprising the steps of:

storing a set of guiding document components on a first storage medium in the computer system, the first storage medium being configured for access by the electronic controller, the guiding document components together representing a guiding document;

providing a set of conformed educational textual elements describing an area of study;

producing a central knowledge base by storing the plurality of conformed educational elements on a second storage medium in the computer system, the second storage medium being configured for access by the electronic controller;

displaying the conformed educational elements to a user;

producing a first bidirectional key, the bi-directional key having a unidirectional first portion indicating correlation between each of the guiding document components and a respective first group of conformed elements in the central knowledge base of informed educational elements on the second storage medium and a second portion indicating correlation between the elements in the central knowledge base and the guiding document components, the first portion being user selectable and the second portion being derived uniquely by the controller from the first portion;

storing the first key on a first key storage medium in the computer system, the first key storage medium being configured for access by the electronic controller;

selecting an educational program component;

storing the educational program component on a third storage medium in the computer system, the third storage medium being configured for access by the electronic controller;

producing a second key indicating correlation between the educational program component and the elements in the central knowledge base;

storing the second key on a second key storage medium in the computer system, the second key storage medium being configured for access by the electronic controller;

identifying guiding document components in the first storage medium correlated to the educational program component;

retrieving the identified guiding document components from their corresponding storage medium.

2. The method of claim 1 wherein the step of identifying the correlated guiding document components in the first storage medium includes the steps of:

retrieving the first key;

producing a bi-directional correlation between the guiding document components and the elements in the central knowledge base from the first key;

retrieving the second key; and producing from the second key and the bi-directional correlation between the guiding document components and elements in the central knowledge base a correlation between the educational program component and the guiding document components.

3. The method of claim 1 wherein the step of selecting the educational program component comprises the steps of:

storing a set of educational resource components as a fourth storage medium;

producing a third key indicating correlation between the stored educational resource components and the elements in the central knowledge base; and selecting the educational component in response to the second key and the third key.

\* \* \* \* \*